(12) United States Patent
Takeuchi

(10) Patent No.: US 8,167,335 B2
(45) Date of Patent: May 1, 2012

(54) FENDER LINER AND PROCESS FOR PRODUCING THE SAME

(75) Inventor: Yuji Takeuchi, Aichi (JP)

(73) Assignee: Hayashi Engineering Inc., Nagoya-shi, Aichi (JP)

( * ) Notice: Subject to any disclaimer, the term of this patent is extended or adjusted under 35 U.S.C. 154(b) by 0 days.

(21) Appl. No.: 12/635,705

(22) Filed: Dec. 11, 2009

(65) Prior Publication Data

US 2010/0078927 A1    Apr. 1, 2010

Related U.S. Application Data

(63) Continuation of application No. PCT/JP2008/058949, filed on May 15, 2008.

(30) Foreign Application Priority Data

Jun. 19, 2007 (JP) ................................ 2007-161135

(51) Int. Cl.
*B62D 25/18* (2006.01)
*B28B 3/00* (2006.01)
*B28B 5/00* (2006.01)

(52) U.S. Cl. ........................................ 280/851; 264/156

(58) Field of Classification Search ............... 280/152.1, 280/152.2, 152.3, 848, 847, 851, 852
See application file for complete search history.

(56) References Cited

U.S. PATENT DOCUMENTS

| | | | | |
|---|---|---|---|---|
| 4,735,427 A | * | 4/1988 | Fuchs | 280/847 |
| 5,108,129 A | * | 4/1992 | Olsen | 280/850 |
| 5,462,331 A | * | 10/1995 | Stief et al. | 296/198 |
| 5,582,430 A | * | 12/1996 | Bauer et al. | 280/851 |
| 5,681,072 A | * | 10/1997 | Stricker | 296/39.3 |
| 6,152,259 A | * | 11/2000 | Freist et al. | 181/290 |
| 7,448,468 B2 | * | 11/2008 | Czerny et al. | 181/210 |
| 7,497,509 B2 | * | 3/2009 | Omiya et al. | 296/198 |
| 2004/0238275 A1 | * | 12/2004 | Keller et al. | 181/286 |
| 2005/0087949 A1 | * | 4/2005 | Presby | 280/152.1 |
| 2006/0175790 A1 | * | 8/2006 | Presby | 280/152.1 |
| 2006/0201741 A1 | * | 9/2006 | Inoue et al. | 181/204 |
| 2007/0202302 A1 | * | 8/2007 | Matsuura et al. | 428/174 |
| 2009/0298374 A1 | * | 12/2009 | Delmas | 442/374 |

FOREIGN PATENT DOCUMENTS

| | | |
|---|---|---|
| JP | 2000-264255 A | 9/2000 |
| JP | 2002-036405 A | 2/2002 |
| JP | 2002-348767 A | 12/2002 |
| JP | 2005-088873 A | 4/2005 |

OTHER PUBLICATIONS

International Search Report for PCT/JP2008/050698 dated Aug. 19, 2008.
PCT Written Opinion of the International Searching Authority for PCT/JP2008/058949 dated Aug. 19, 2008.
Chinese Office Action dated Mar. 17, 2011.

* cited by examiner

*Primary Examiner* — J. Allen Shriver, II
*Assistant Examiner* — Bridget Avery
(74) *Attorney, Agent, or Firm* — Yokoi & Co., U.S.A., Inc.; Toshiyuki Yokoi

(57) ABSTRACT

The present invention discloses a fender liner attached to a motor vehicle wheel house. The fender liner includes a breathable base material layer produced by forming a fiber assembly into a shape along the wheel house and a protective layer made of waterproof material. The protective layer is superimposed on a surface of the base material layer that is opposite to a side facing the wheel house. The protective layer is provided with a plurality of through-holes that allow air to flow through the protective layer to the surface of the base material layer on which the protective layer is superimposed.

10 Claims, 15 Drawing Sheets

COMPARATIVE EXAMPLE

FENDER LINER AND PROCESS FOR PRODUCING THE SAME

CROSS-REFERENCES TO RELATED APPLICATIONS

This application claims the benefit of priority and is a Continuation application of the prior International Patent Application No. PCT/JP2008/058949, with an international filing date of May 15, 2008, which designated the United States, and is related to the Japanese Patent Application No. 2007-161135, filed Jun. 19, 2007, the entire disclosures of all applications are expressly incorporated by reference in their entirety herein.

BACKGROUND OF THE INVENTION

1. Field of the Invention

The present invention relates to a fender liner attached to a motor vehicle wheel house, and to a process for producing the same.

2. Description of Related Art

A fender liner is attached to a motor vehicle wheel house so as to cover the upper side of a tire. In a running vehicle, there are cases in which, for example, road noise is generated between tires and road surface, or impact noise is generated because gravels, sand, water, and the like thrown up by tires hit the fender liners. In order to reduce these noises such as the road noise and the impact noise, a countermeasure is taken in which a fiber-based type fender liner that is formed by heating and press-forming a sheet-like material made of a mixture of fibers and latex is attached to the wheel house.

In addition, Japanese Patent Application Publication No. JP-A-2000-264255 describes a fender liner that is composed of a hard fiberboard formed into a shape fitted to the inner surface of a vehicle body fender.

However, the fiber-based type fender liner has problems in antifouling performance and anti-icing performance because muddy water, snow, or ice thrown up by the tire easily adheres to the fender liner while the vehicle is running. Note that the anti-icing performance refers to performance preventing ice from adhering. Particularly, when the vehicle runs on a snow-covered road in a cold region, freezing of the fender liner itself can cause a large amount of ice and snow to adhere to the fender liner. In order to allow the vehicle to run, it is desirable to prevent the large amount of ice and snow from adhering to the fender liner.

The specification of U.S. Pat. No. 4,735,427 describes the use of a needled plastic-fiber fleece material as a wheel housing lining for a motor vehicle wheel housing. This specification describes that a coating of a water impermeable elastomeric material is applied on the surface of the plastic-fiber fleece material opposite to the side facing the wheel housing.

However, if the coating of the water impermeable elastomeric material is applied on the surface of the plastic-fiber fleece material, sound absorbing performance to absorb the noises such as the road noise and the impact noise may deteriorate.

BRIEF SUMMARY OF THE INVENTION

The present invention discloses a fender liner that is favorable not only in antifouling performance and anti-icing performance, but also in sound absorbing performance.

One aspect of the present invention provides a fender liner attached to a motor vehicle wheel house, comprising:
a breathable base material layer produced by forming a fiber assembly into a shape along the wheel house;
a protective layer made of waterproof material;
the protective layer is superimposed on a surface of the base material layer that is opposite to a side facing the wheel house; and
the protective layer is provided with a plurality of through-holes that allow air to flow through the protective layer to the surface of the base material layer on which the protective layer is superimposed.

That is, the muddy water, snow, or ice thrown up by the tire while the vehicle is running is shut out to a certain extent by the protective layer of waterproof material, thus reducing the muddy water, snow, or ice adhering to the breathable base material layer produced by forming the fiber assembly. Therefore, the snow or ice adhering to the fender liner is reduced while the vehicle is driven in a cold region. Consequently, this fender liner ensures favorable antifouling performance as well as favorable anti-icing performance. In addition, because the muddy water, snow, or ice adhering to the base material layer is reduced, the sound absorbing performance of the base material layer is maintained.

Moreover, the noise such as the road noise and the impact noise penetrates through the through-holes of the protective layer into the base material layer, and is absorbed by the base material layer. Consequently, this fender liner also ensures favorable sound absorbing performance.

The base material layer produced by forming the fiber assembly includes both a base material layer produced by forming an assembly of only fibers and a base material layer produced by forming a fiber assembly using other material than fibers. The base material layer includes a layer produced by thermoforming a large number of thermoplastic fibers by press-forming or the like, and a layer produced by thermoforming, through press-forming or the like, a material made by adding binder of thermoplastic fibers, thermoplastic resin, or the like to a large number of thermoplastic or non-thermoplastic matrix fibers.

The protective layer of waterproof material includes a layer produced by superimposing on the base material layer a thermoplastic resin material that is thermoformed into a film-like shape, a coating layer produced by solidifying molten thermoplastic resin material applied on the base material layer, a layer of thermosetting waterproof film, and a coating layer produced by hardening thermosetting liquid material applied on the base material layer. Note that the waterproofness refers to the property of resisting to passing or penetration of water, and includes a concept of water protection.

Another aspect of the present invention provides a process for producing a fender liner attached to a motor vehicle wheel house, comprising:
superimposing a waterproof thermoplastic film-like material on one surface of a breathable sheet-like material of a fiber assembly;
forming a plurality of through-holes by passing a plurality of hot needles through the film-like material from the side of the film-like material using a perforator equipped with the plurality of hot needles; and
forming the film-like material provided with the plurality of through-holes and the sheet-like material into a shape along the wheel house while heating the materials in a superimposed state.

That is, because the waterproof thermoplastic film-like material is superimposed on the surface of the sheet-like material, the hot needles of the perforator can easily form the plurality of through-holes in the film-like material. In addition, because the sheet-like material and the film-like material are formed into a shape along the wheel house after the plurality of through-holes have been formed in the film-like material, the fender liner of a three-dimensional shape composed of the film-like material provided with the plurality of through-holes can be easily formed.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

(1) STRUCTURE OF FENDER LINER

Figure 1:
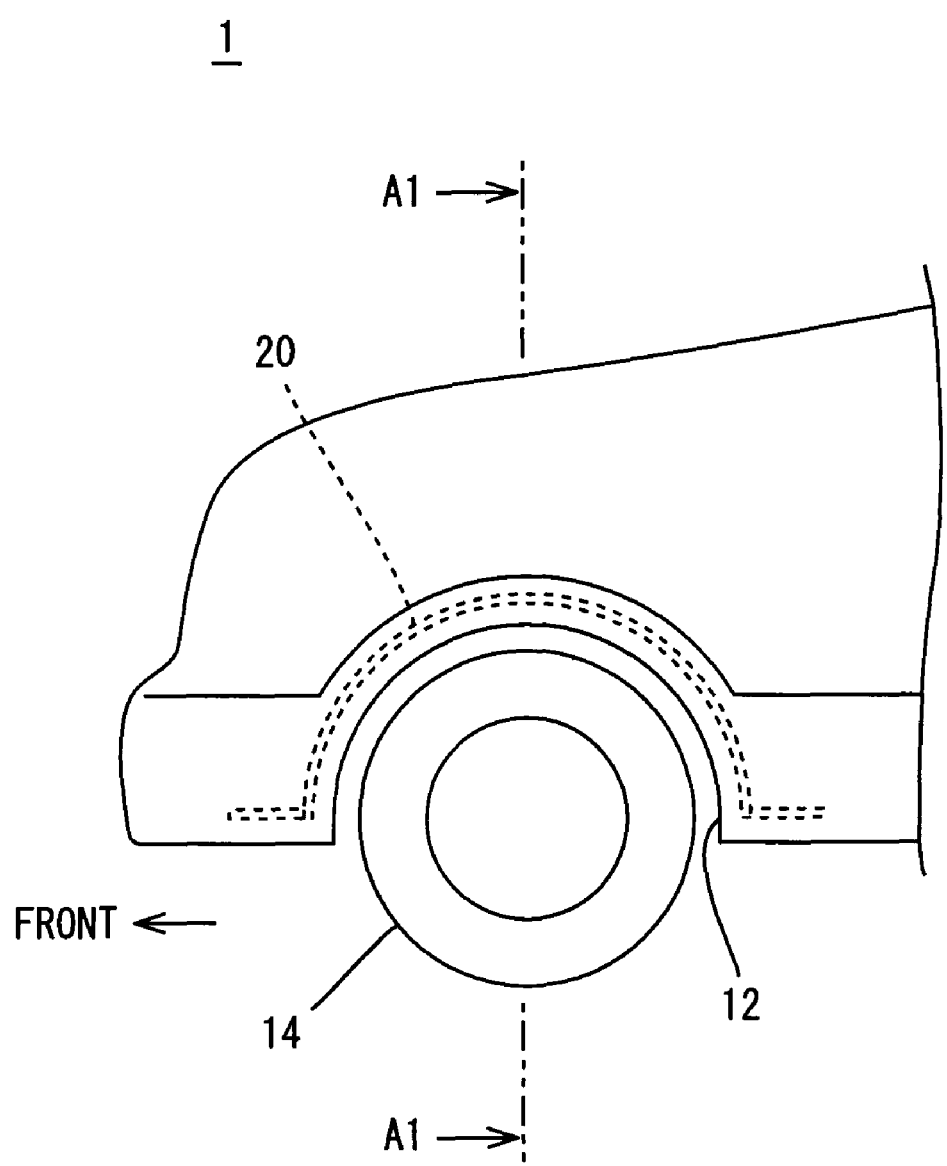
FIG. 1 is a side view of an essential part showing an example of a motor vehicle equipped with a fender liner.

FIG. 1 shows a front section of a road vehicle 1 equipped with a fender liner 20 according to an embodiment of the present invention. The vehicle 1 to which the present invention can be applied includes various types of motor vehicles, such as station wagon type and sedan type passenger vehicles suitably designed and equipped for use on the road.

Normally, a tire 14 is arranged on each of the right and left sides of the front section and on each of the right and left sides of the rear section of the vehicle 1, and a wheel house 12 is arranged on the upper side of each tire 14. The wheel house, which is also called a wheel house panel or a wheel housing, constitutes a part of a vehicle body. The wheel house 12 is made of metal, and formed into a shape covering the upper side of the tire 14. The surface of the wheel house 12 on the side of the tire 14 serves as an outer surface of the vehicle, and the fender liner 20 is attached to the wheel house 12 so as to cover this outer surface. The fender liner 20 serves as a vehicle exterior part for preventing body panels from being damaged by gravels, muddy water, or the like thrown up by the tire from the road surface while the vehicle is running, and also for reducing noise such as road noise generated between the tire and the road surface.

Figure 2:
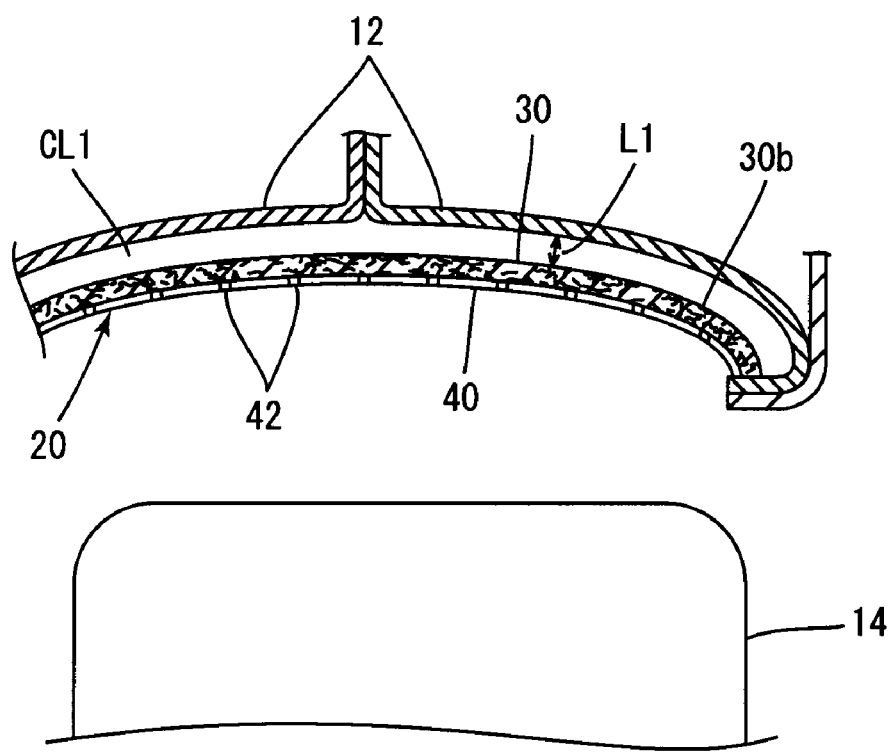
FIG. 2 is an exemplary illustration of a vertical end view showing an essential part of the fender liner and surrounding area thereof as viewed from position A1-A1 in FIG. 1.
Figure 3:
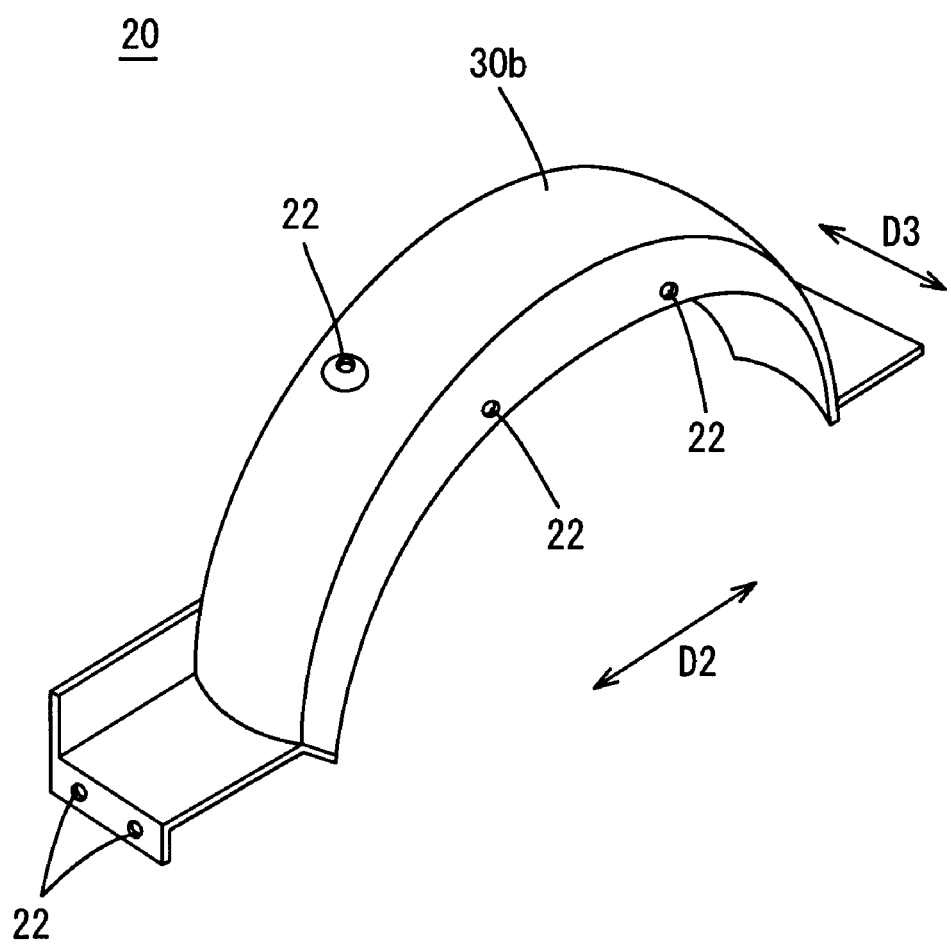
FIG. 3 is a perspective view showing an example of the fender liner.

FIG. 2 shows the fender liner 20 and the surrounding area thereof as viewed from position A1-A1 in FIG. 1. FIG. 3 shows an external view of the fender liner 20. Note that, for clarity of illustration, viewable backgrounds are not depicted in FIGS. 2, 4, 5, 7, and 8.

As shown in FIG. 3, the fender liner 20 has a plurality of mounting holes 22 for attaching the fender liner 20 to the wheel house 12, and is formed into a shape along the wheel house 12. The fender liner 20 is formed so as to have substantially semicircular arc shapes in a longitudinal direction D2 and a vehicle width direction D3 of the vehicle, and both edge portions in the vehicle width direction D3 are curved downward to form a wall shape. For the fender liner 20, a material is used that is favorable not only in stiffness and durability but also in formability and shape retainability.

Then, the fender liner 20 is attached and fixed to the wheel house 12, by screws, bolts, clips, or the like inserted through the mounting holes 22.

The outline of this fender liner 20 will be described as follows.

The fender liner 20 is provided with a base material layer 30 arranged on the side of the wheel house 12 and a protective layer 40 arranged on the side of the tire 14.

The base material layer 30 is formed by assembling a large number of fibers into the shape along the wheel house 12 so as to be a breathable layer. As a result, the base material layer 30 functions as a sound absorbing material that absorbs the energy of incident sound.

Figure 4:
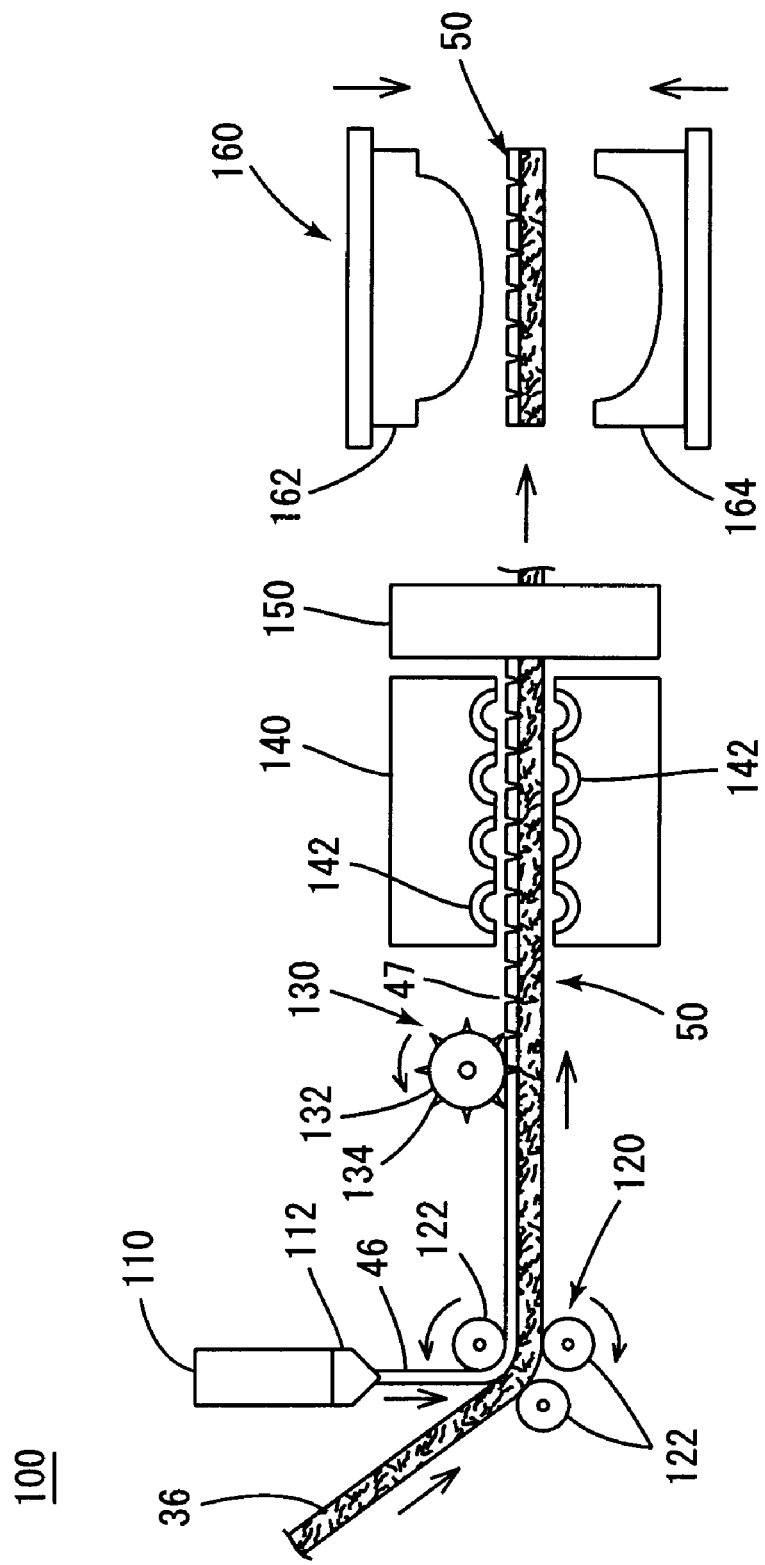
FIG. 4 is a view schematically showing an example of a fender liner manufacturing apparatus.
Figure 5:
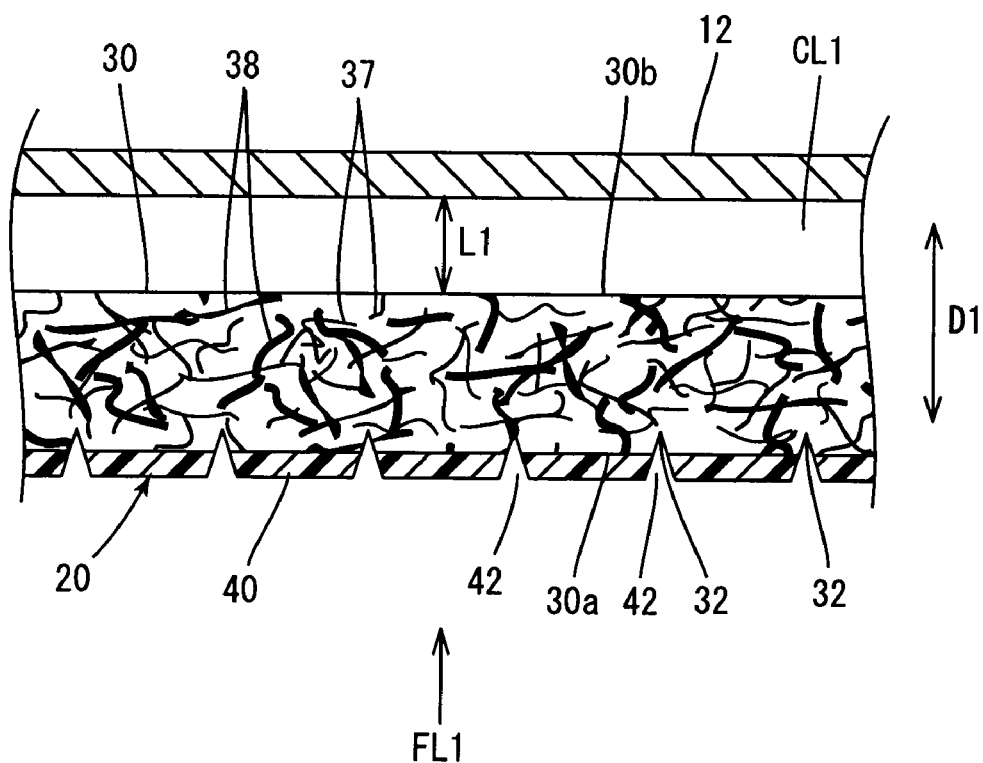
FIG. 5 is an exemplary illustration of a vertical end view showing an essential part of the fender liner produced by the apparatus shown in FIG. 4 and surrounding area of the fender liner.

FIG. 5 shows an essential part of the fender liner 20 and the surrounding area thereof in a state in which the fender liner 20 produced by a fender liner manufacturing apparatus 100 shown in FIG. 4 is attached to the wheel house 12. As shown in FIG. 5, the protective layer 40 made of waterproof material is superimposed on a surface 30a of the base material layer 30 that is opposite to the side facing the wheel house 12. Here, the protective layer 40 is provided with a plurality of through-holes 42 passing through the fender liner 20 in the thickness direction D1. The through-holes 42 allow air to flow through the protective layer 40 to the surface 30a of the base material layer 30 on which the protective layer 40 is superimposed.

Here, the surface of the base material layer on which the protective layer is superimposed refers to the entire surface on which the protective layer is superimposed, including the portions exposed by the through-holes 42. Note that, although the mounting holes 22 are holes passing through the both layers 30 and 40, the laminated surface 30a is not exposed at the mounting holes 22, thereby air does not flow through the protective layer 40 to the superimposition surface 30a. Consequently, the mounting holes 22 do not serve as the through-holes 42 of the present invention.

On the other hand, basically nothing is superimposed on a back surface 30b of the base material layer 30 facing the wheel house 12.

Thus, the noise such as road noise generated between the tire 14 and the road surface, or impact noise generated when gravels, sand, and water thrown up by the tire 14 hit the fender liner 20 passes through the through-holes 42 to the base material layer 30, and is absorbed by the material layer 30.

Next, details of the fender liner 20 will be described.

The base material layer 30 is made of breathable material so as to have sound absorbing performance, and is provided with required formability and shape retainability after forming.

The fibers for forming the base material layer 30 may be totally thermoplastic fibers, or may be a mixture of thermoplastic fibers and fibers, such as glass fibers or rayon fibers, that do not show thermoplasticity. The thermoplastic fibers for forming the base material layer include thermoplastic resin fibers and fibers made by adding additives such as fillers to the thermoplastic resin. As the thermoplastic fibers, various kinds of fibers can be used including: fibers composed of thermoplastic resin such as polyolefin such as polyethylene (PE) and polypropylene (PP), polyester such as polyethylene terephthalate (PET), and polyamide; fibers composed of thermoplastic resin made by modifying these types of thermoplastic resin to adjust the melting point thereof; and fibers of material made by adding additives such as fillers to the above thermoplastic resin.

In the present embodiment, as shown in FIG. 5, matrix fibers 37 and binder fibers 38 are used as fibers for forming the base material layer 30. As the matrix fibers 37, thermoplastic resin fibers, fibers made by adding additives such as fillers to the thermoplastic resin, and the like can be used, and various kinds of fibers can be used including polyester fibers such as PET fibers, PP fibers, polyamide fibers, glass fibers, rayon fibers, and fibers of material made by further adding additives such as fillers. The matrix fibers can have a fiber diameter of 5 to 60 μm and a fiber length of 10 to 100 mm.

As the binder fibers 38, thermoplastic resin fibers, fibers made by adding additives such as fillers to the thermoplastic resin, and the like can be used, and various kinds of fibers can be used including: fibers composed of thermoplastic resin such as polyolefin such as PE and PP, polyester such as PET, and polyamide; fibers composed of thermoplastic resin made by modifying these types of thermoplastic resin to adjust the melting point thereof; and fibers of material made by adding additives such as fillers to the above thermoplastic resin. When the matrix fibers are thermoplastic fibers, it is preferable to use, as the binder fibers, thermoplastic fibers with lower melting point than that of the matrix fibers. For example, by using fibers that are compatible with the matrix fibers as the binder fibers, a good adhesion is obtained between the matrix fibers and the binder fibers, thereby providing a sufficient shape retainability to the base material layer. The binder fibers can have a melting point of 100° C. to 220° C.

In addition, a fiber that can be used as a binder fiber may be formed into a sheath, and the outer circumference of a core having higher melting point than that of the sheath may be enclosed by the sheath to form a fiber with core-sheath structure, and such fibers may be used as the binder fibers 38. In this case, fibers that can be used as the matrix fibers 37 can be used as the cores. The combination of core and sheath may be PP and PE, PET and PE, or PET with high melting point and PET with low melting point, respectively. By using fibers with core-sheath structure as the binder fibers 38, the shape retainability of the fender liner that is formed into a three-dimensional shape can be improved because only the sheaths melt whereas the cores do not melt when heated.

The binder fibers 38 can have a fiber diameter of 4 to 45 μm and a fiber length of 10 to 100 mm. The blending ratio between the matrix fibers 37 and the binder fibers 38 can be such that the matrix fibers are approximately 30% to 95% (more preferably 50% to 95%) by weight and the binder fibers are approximately 5% to 70% (more preferably 5% to 50%) by weight.

Note that the breathable base material layer may be formed by using non-fibrous binder instead of binder fibers. The base material layer in this case is also a base material layer formed by assembling fibers.

As a material used for thermoforming the base material layer 30, for example, mixed fiber felt (sheet-like material) obtained by intertwining a mixture of the matrix fibers 37 and the binder fibers 38 by needling (needle punching) can be used. By using this mixed fiber felt and thermoforming the base material layer 30 into the shape of the fender liner by press-forming or the like and cooling the base material layer, the fender liner of a required shape can be obtained. Obviously, a sheet-like material of only one kind of fibers can also be used, and a sheet-like material formed by assembling a number of fibers using a method other than needling can also be used.

The thickness of the base material layer 30 is preferably 1.0 to 10.0 mm, and more preferably 2.0 to 6.0 mm. The weight per unit area of the base material layer 30 is preferably 500 to 1000 g/m$^2$, and more preferably 600 to 900 g/m$^2$. The thickness and the weight per unit area of the base material layer should be at least the above-mentioned lower limits in order to ensure sufficient levels of stiffness, shape retainability, and sound absorbing performance of the fender liner. On the other hand, the thickness and the weight per unit area of the base material layer should be at most the above-mentioned upper limits in order to reduce the weight of the fender liner sufficiently.

The flow resistance value of the base material layer 30 is preferably 20 to 500 Nsm$^{-3}$, and more preferably 60 to 250 Nsm$^{-3}$. Note that the flow resistance value in this specification is assumed to be the flow resistance value according to ISO 9053 (Acoustics—Materials for acoustical applications—Determination of airflow resistance). The flow resistance value should be within the above-mentioned range in order to efficiently convert the sound penetrating into the base material layer to thermal energy by viscous resistance provided by the fibers composing the base material layer.

The protective layer 40 is made of waterproof material so as to have antifouling performance and anti-icing performance. As a material for forming the protective layer 40, various materials can be used including: thermoplastic resin material such as polyolefin such as PE and PP, polyester such as PET, and polyamide; thermosetting resin material; and modified resin material (for example, modified polyester resin) made by modifying these types of resin material to adjust the melting point thereof. Additives such as fillers may be added to these resin materials.

It is preferable to use thermoplastic resin material as a material composing the protective layer because, in that case, the resin material can be thermoformed into a film-like shape so as to be easily superimposed on the base material layer, thus enabling easy thermoforming of the fender liner.

Figure 6:
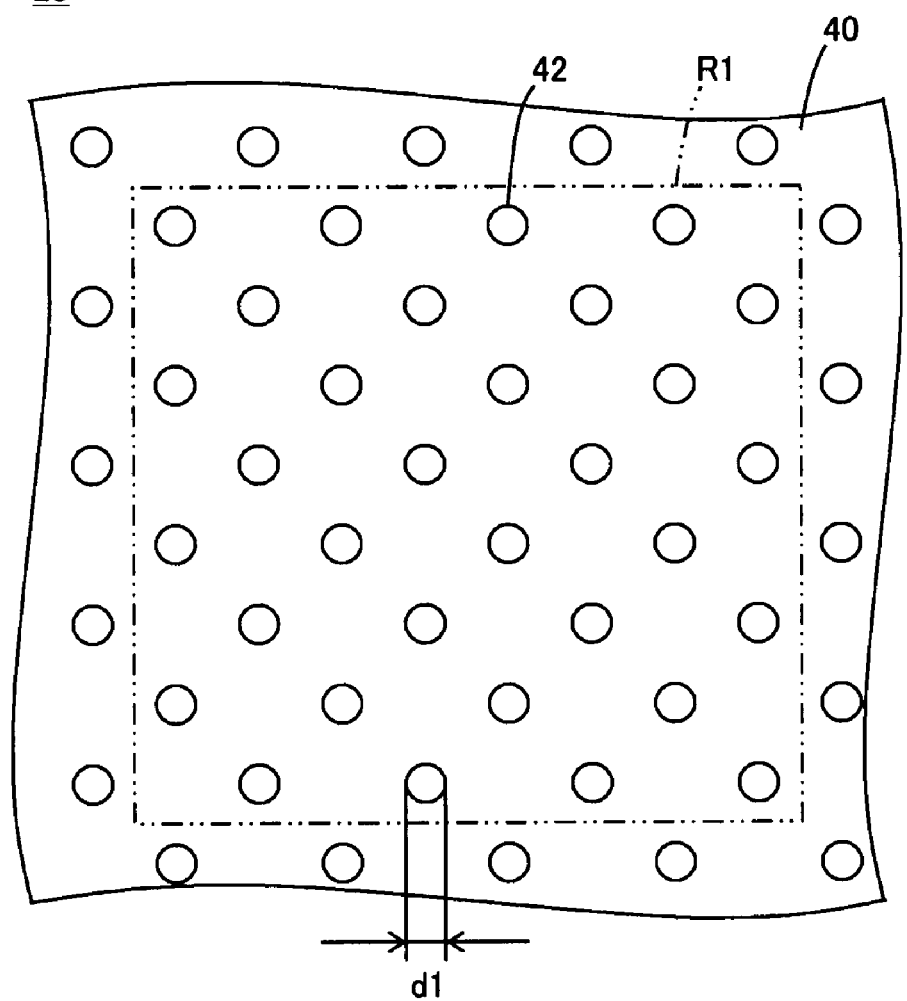
FIG. 6 is an exemplary illustration of a view showing an essential part on a protective layer side of the fender liner.

On the other hand, in order to allow air to flow through the protective layer 40 to the surface 30a of the base material layer 30 on which the protective layer is superimposed, the protective layer 40 is provided with the large number of through-holes 42 passing through in the thickness direction D1, as shown in FIGS. 5 and 6. Although the through-holes 42 in the present embodiment have a substantially circular shape, the through-holes may be of various shapes. By providing the protective layer 40 with the through-holes 42, the noise such as road noise generated between the tire and the road surface while the vehicle is running is absorbed by the base material layer 30 through the through-holes 42, thereby enabling the base material layer 30 to exhibit sufficient sound absorbing performance.

The thickness of the protective layer 40 is preferably 100 to 500 μm. The weight per unit area of the protective layer 40 is preferably 100 to 300 g/m². The thickness and the weight per unit area of the protective layer should be within the above-mentioned ranges in order to facilitate the provision of the through-holes in the film-like material for forming the protective layer.

The sound absorbing performance of the fender liner 20 can be controlled by changing the hole diameter or the number per area of the through-holes 42 to adjust the flow resistance value of the protective layer 40. The flow resistance value of the protective layer 40 is preferably 200 to 3800 $Nsm^{-3}$, and more preferably 300 to 2300 $Nsm^{-3}$. The flow resistance value of the protective layer should be at least the above-mentioned lower limits in order to facilitate the control of the entire fender liner flow resistance at a required flow resistance level or more, whereas the flow resistance value of the protective layer should be at most the above-mentioned upper limits in order to facilitate the control of the entire fender liner flow resistance at a required flow resistance level or less.

The diameter of the through-holes 42 is preferably 0.3 to 5.0 mm, more preferably 0.4 to 1.6 mm, and even more preferably 0.6 to 1.3 mm. An opening ratio p in percentage of area of the protective layer 40 is preferably 0.5% to 15.0%, more preferably 2.0% to 10.0%, and even more preferably 4.0% to 7.0%. Here, the opening ratio p refers to a total area S2 of the through-holes 42 relative to an area S1 of whole area or a predetermined area R1 of the protective layer 40, that is, S2/S1. Denoting the diameter of each of the through-holes 42 as d1, and the number of the through-holes 42 provided in the protective layer of the area S1 as n1, the opening ratio p is given as $p=n1\times\pi(d1/2)^2/S1$. The diameter of the through-holes and the opening ratio p of the protective layer should be within the above-mentioned ranges in order to attain favorable levels in all of the antifouling performance, the anti-icing performance, and the sound absorbing performance of the fender liner, by controlling the flow resistance value of the protective layer at a suitable flow resistance value.

By experimentally investigating the change in sound absorption coefficient when the overall flow resistance value of the fender liner 20 is changed, it has been found that the overall flow resistance value of the fender liner is preferably 250 to 4000 $Nsm^{-3}$, more preferably 730 to 3000 $Nsm^{-3}$, and even more preferably 830 to 2500 $Nsm^{-3}$. Therefore, the sound absorbing performance of the fender liner can be made particularly favorable by controlling the overall flow resistance value of the fender liner within the above-mentioned range.

As shown in FIG. 5, the surface 30a of the base material layer 30 on which the protective layer is superimposed may be provided with holes 32 that are connected to the through-holes 42 and recessed toward the wheel house 12. The example in FIG. 5 shows that the holes 42 and 32 pass through the protective layer 40 and extend deeply to the midway of the base material layer 30. The noise such as road noise generated between the tire and the road surface is allowed to easily pass through the through-holes 42 and reach the inside of the base material layer 30, thereby facilitating absorption of the energy. Particularly, it is preferable to provide the holes 42 and 32 of substantially conical shape because sound waves are easily absorbed by the base material layer 30.

As described above, the sound absorbing performance of the fender liner can be further improved by providing the laminated surface 30a with the holes 32 connected to the through-holes 42.

Note that a back air layer (clearance CL1) may be provided between the fender liner 20 and the wheel house 12, as shown in FIGS. 2 and 5. When the fender liner 20 is attached to the wheel house 12 such that the back surface 30b of the base material layer of the fender liner contacts the wheel house 12 around the mounting holes 22, it is only necessary, for example, to form the fender liner 20 such that the fender liner 20 is spaced from the wheel house 12 except around the mounting holes 22. A distance L1 of the clearance CL1 may be, for example, approximately 5 to 30 mm.

By providing the back air layer between the fender liner and the wheel house, a Helmholtz type sound absorber is formed by the fender liner and the wheel house. By this effect, a sound absorbing performance different from that of the fibrous base material layer becomes also effective. As a result, two sound absorption effects are obtained: a sound absorption effect by the fibrous base material layer particularly suitable for high-frequency range; and a sound absorption effect by Helmholtz type sound absorber particularly suitable for medium-frequency range. Consequently, vehicle interior quietness can be further improved.

(2) PROCESS FOR PRODUCING FENDER LINER

FIG. 4 schematically shows an example of the fender liner manufacturing apparatus 100. FIG. 5 shows an essential part of the fender liner 20 obtained by the same apparatus 100. The manufacturing apparatus 100 shown in FIG. 4 is equipped with an extruder 110, a film laminating machine 120, a perforator 130, a heating unit 140, a cutter 150, and a press-forming machine 160, and produces the fender liner 20 that is attached to the wheel house 12.

First of all, a film-like material 46 to serve as the protective layer 40 is superimposed on one surface of a sheet-like material 36 to serve as the base material layer 30. The sheet-like material 36 is a material to form the base material layer 30, and is a material of fiber assembly such as a fiberboard formed by needling to intertwine the matrix fibers with the binder fibers. The sheet-like material 36 is continuously fed to the film laminating machine 120 by a sheet feeder, or the like.

On the other hand, the film-like material 46 is a material to form the protective layer 40, and is a waterproof thermoplastic material such as a thermoplastic resin film. In the extruder 110, thermoplastic material for forming the film-like material 46 is heated to melt, and the thermoplastic material in the molten state is extruded (thermoformed) through a T-die (flat die) 112 into a film shape. The extruded film-like material 46 is fed toward the perforator 130 while being sandwiched together with the sheet-like material 36 by rollers 122 of the film laminating machine 120. In this way, the film-like material 46 is pressed to the sheet-like material 36 to be superimposed on the sheet-like material 36.

The perforator 130 has a long drum 132 rotatable around the center axis thereof in the longitudinal direction, and on the outer circumference of the drum 132, a large number of hot needles 134 are provided at a required density. Each of the hot needles 134 has a length larger than the thickness of the film-like material 46, but smaller than the thickness of the sheet-like material 36. By this setting, the holes 32 are provided on the side of the laminated surface 30a with a depth to the midway of the base material layer 30. In addition, the diameter and the density (number) of the through-holes 42 of the protective layer 40 can be adjusted by the diameter and the distribution density of the hot needles 134 implanted to the long drum 132. To change the density of the through-holes 42, it is only necessary to change the drum to a suitable one for the density of through-holes to be formed, or to use a drum with hot needles that are retractable relative to the drum. Moreover, the density of the through-holes can also be adjusted by regulating the rotational speed of the drum 132 and the feed rate of the film-like material 46. Note that the opening ratio of the film-like material may be changed depending on the location on the fender liner.

The temperature of the needles 134 is preferably at least at the melting point of the thermoplastic material for forming the film-like material 46. If the temperature of the needles is lower than the melting point of the thermoplastic material, burrs may occur at the peripheries of through-holes when the needles are pierced through the film-like material. Thus, the through-holes may be closed when the film-like material is superimposed on the sheet-like material, or the through-holes may be closed when the laminate of the sheet-like material and the film-like material is thermoformed into the shape of the fender liner.

In addition, the diameter of through-holes 47 provided in the film-like material 46 is suitably larger than that of the through-holes 42 provided in the protective layer, preferably 0.6 to 10.0 mm, more preferably 1.0 to 7.0 mm, and even more preferably be 1.5 to 2.5 mm. The opening ratio of the film-like material 46 is also suitably larger than the opening ratio of the protective layer, preferably 5.0% to 35.0%, more preferably 10.0% to 30.0%, and even more preferably 20.0% to 25.0%.

The perforator 130 provides the laminate made by superimposing the film-like material 46 on the sheet-like material 36 with the plurality of through-holes 47, by piercing the plurality of hot needles 134 through the film-like material 46 from the side of the film-like material 46. At this time, the surface 30a on which the protective layer is superimposed is provided with the holes 32 connected to the through-holes 47 and recessed toward the wheel house 12. Therefore, the sound absorbing performance of the fender liner can be made particularly favorable.

The laminate provided with the through-holes 47 is fed toward the heating unit 140.

Then, the film-like material 46 and the sheet-like material 36 provided with the plurality of through-holes 47 are heated in a laminated state and are formed into the shape along the wheel house 12, thus obtaining the fender liner 20. The example in the figure shows that the laminate is heated by heaters 142 of the heating unit 140, and cut while being clamped by the cutter 150 into a laminate 50 of a predetermined size, which is then transferred to a space between forming dies (an upper die 162 and a lower die 164) of the press-forming machine 160 and press-formed by clamping the dies. In this case, the laminate 50 is plastically deformed by the molten binder fibers 38. In addition, the film-like material 46 is bonded to the laminated surface 30a of the base material layer by the molten binder fibers 38, or the remolten film-like material 46 is bonded to the superimposition surface 30a.

The above production process is obviously a mere example, and therefore, the fender liner can be produced by various kinds of processes. For example, the film-like material may be wound in a roll shape and fed to the film laminating machine while being continuously unwound.

In this production process, because the film-like material 46 is superimposed on the sheet-like material 36, the large number of through-holes 47 can be easily formed in the film-like material 46 by the hot needles 134. In addition, because the laminate 50 is formed into the shape along the wheel house after the through-holes 47 have been formed in the film-like material 46, the fender liner 20 of a three-dimensional shape composed of the protective layer 40 with the large number of through-holes 42 can be easily formed. Consequently, it is possible to effectively produce the fender liner with favorable antifouling and anti-icing performances and with favorable sound absorbing performance.

Figure 7:
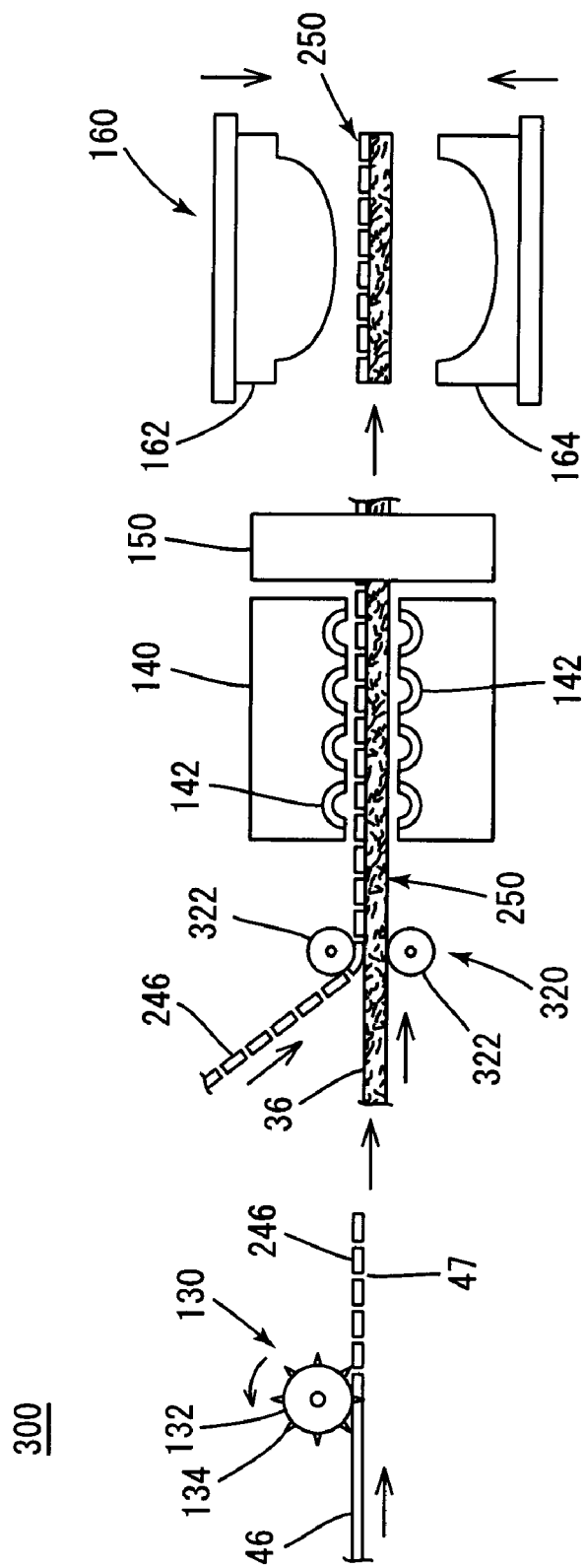
FIG. 7 is a view schematically showing another example of the fender liner manufacturing apparatus.
Figure 8:
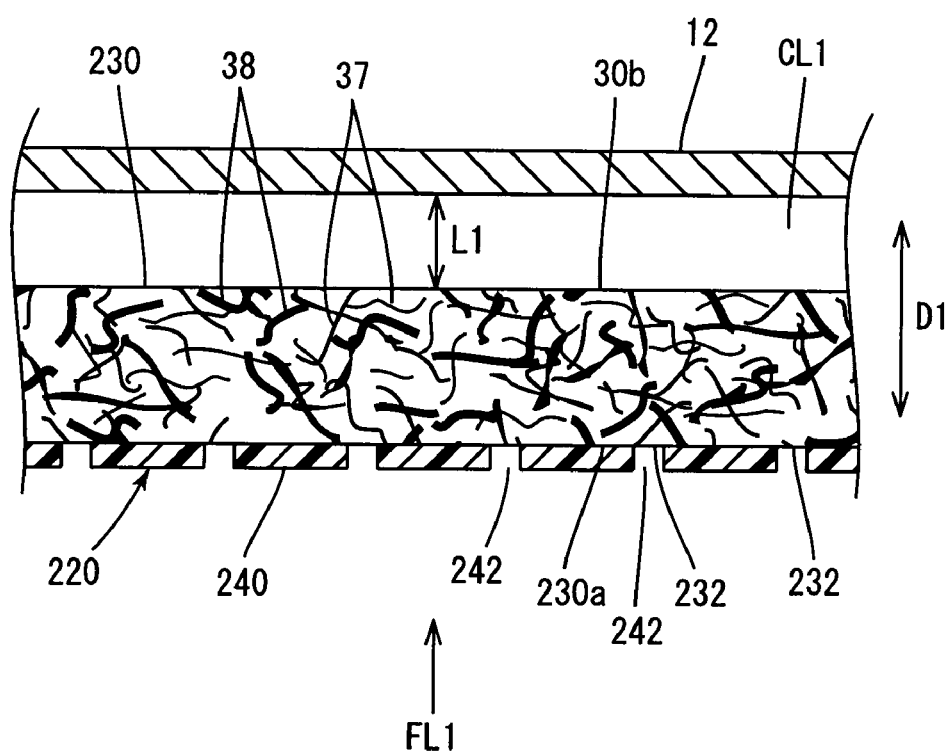
FIG. 8 is an exemplary illustration of a vertical end view showing an essential part of the fender liner produced by the apparatus shown in FIG. 7 and surrounding area of the fender liner.

Alternatively, a fender liner 220 illustrated in FIG. 8 may be produced by a fender liner manufacturing apparatus 300 illustrated in FIG. 7. The fender liner manufacturing apparatus 300 shown in FIG. 7 is equipped with the perforator 130, a film laminating machine 320, the heating unit 140, the cutter 150, and the press-forming machine 160.

The waterproof thermoplastic film-like material 46 is continuously fed to the perforator 130 by a film feeder, or the like. First of all, the perforator 130 pierces the plurality of hot needles 134 through the film-like material 46 to form the plurality of through-holes 47. The perforator 130 of this manufacturing apparatus pierces the hot needles 134 only through the film-like material 46 to form the through-holes 47. A film-like material 246 provided with the through-holes 47 is fed toward the film laminating machine 320.

On the other hand, the sheet-like material 36 of the fiber assembly is continuously fed to the film laminating machine 320 by a sheet feeder, or the like.

The film-like material 246 provided with the through-holes 47 is fed toward the heating unit 140 while being sandwiched together with the sheet-like material 36 by rollers 322 of the film laminating machine 320. In this way, the film-like material 246 is pressed to the sheet-like material 36 to be superimposed on one surface of the sheet-like material 36.

Then, the film-like material 246 and the sheet-like material 36 are heated by the heating unit 140 in a laminated state, and a laminate 250 is formed by the press-forming machine 160 into the shape along the wheel house 12 to obtain the fender liner 220. As shown in FIG. 8, the fender liner 220 is not provided with holes at locations 232 connected to through-holes 242 of a protective layer 240 on a laminated surface 230a of a base material layer 230.

Because the laminate 50 is also formed into the shape along the wheel house after the large number of through-holes 47 have been formed in the film-like material 46 in the production process, the fender liner 20 of a three-dimensional shape composed of the protective layer 40 with the large number of through-holes 42 can be easily formed.

(3) WORKINGS AND EFFECTS OF FENDER LINER

The workings and effects of the fender liner 20 will be described below with reference to FIG. 5. FIG. 5 shows an example of noise propagation direction with arrow FL1.

Because the waterproof protective layer 40 is formed on the surface of the fender liner 20 that is opposite to the side facing the wheel house 12, the muddy water, snow, or ice thrown up by the tire 14 while the vehicle 1 is running is shut out to a certain extent by the protective layer 40 that is comparatively smooth. That is, the muddy water, snow, or ice hardly adheres to the fibrous base material layer 30 that is comparatively uneven, while the muddy water, snow, or ice easily comes off the protective layer 40 that is comparatively smooth. Therefore, the snow or ice adhering to the fender liner 20 is reduced while the vehicle is driven on a snow-covered road in a cold region, or the like. Consequently, the fender liner 20 ensures favorable antifouling performance as well as favorable anti-icing performance. In addition, because the muddy water, snow, or ice adhering to the fibrous base material layer 30 is reduced, the sound absorbing performance of the base material layer 30 is maintained.

Figure 15:
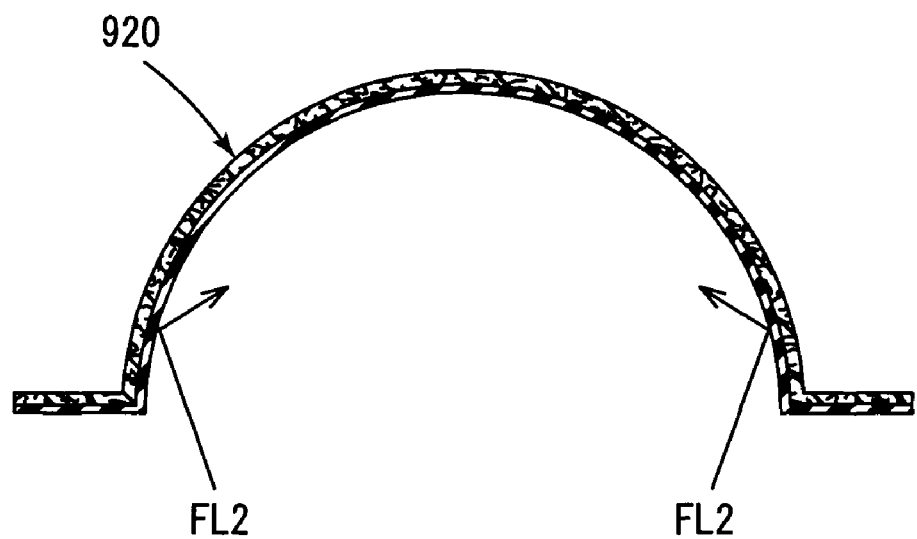
FIG. 15 is a vertical end view schematically showing workings of a fender liner according to a related-art example.

Here, if a water impermeable material formed on the surface on a side opposite to the side facing the wheel house is not provided with through-holes as shown as a fender liner 920 of a comparative example shown in FIG. 15, most of the noise such as the road noise and the impact noise is reflected by the water impermeable material. FIG. 15 shows an example of noise propagation direction with arrow FL2. More specifically, because the noise such as the road noise hardly enters the fibrous base material, the noise energy is hardly attenuated, and therefore, the sound absorbing performance of the fender liner 920 is not satisfactory.

On the other hand, in the fender liner 20 of the present embodiment, the noise such as the road noise and the impact noise enters the base material layer 30 through the through-holes 42 of the protective layer, and the noise energy is attenuated in the base material layer 30. Consequently, the fender liner 20 ensures favorable sound absorbing performance, thereby improving vehicle interior quietness.

In addition, by providing the clearance CL1 between the fender liner 20 and the wheel house 12, a favorable sound absorbing performance is obtained in the medium-frequency range that is easily audible to the human ear, by an effect of Helmholtz type sound absorbing property. Although the frequency range of the noise such as the road noise and the impact noise is wide, a favorable sound absorbing performance is obtained by the sound absorption effect in the high-frequency range due to the fibrous base material layer 30 itself and also by the Helmholtz type sound absorption effect.

As described above, with the present invention, it is possible to provide the fender liner with favorable antifouling and anti-icing performances and with favorable sound absorbing performance.

Note that the flow resistance value of the fender liner can be adjusted by regulating, for example, the size and the number of the through-holes of the protective layer. When the flow resistance value of the fender liner can be adjusted, sound waves in the suitable frequency range for vehicle characteristics can be effectively absorbed. Therefore, the fender liner with required sound absorbing property can be easily designed.

In addition, the film-like material is provided with the through-holes 47 that are larger than the through-holes 42 provided in the protective layer. Thus, the production process of the present invention is characterized in that the fender liner is produced by forming the plurality of through-holes by passing the plurality of hot needles through the waterproof thermoplastic film-like material using the perforator equipped with the plurality of hot needles, and by forming the film-like material with the plurality of through-holes and the breathable sheet-like material of the fiber assembly into the shape along the wheel house while heating the materials in a laminated state. As a result, the through-holes are suppressed from being closed when the laminate of the sheet-like material and the film-like material is thermoformed, thereby enabling the efficient production of the fender liner having not only favorable antifouling and anti-icing performances, but also favorable sound absorbing performance.

(4) VARIATIONS

The film-like material for forming the protective layer may be a film with layered structure in which an adhesive layer is superimposed on a resin layer.

The through-holes may be formed in the film-like material by using punches (tools) used in punching process.

The fender liner of the present invention may be additionally provided with a part other than the base material layer and the protective layer. For example, a film-like material with through-holes may also be superimposed on the back surface of the base material layer.

Figure 9:
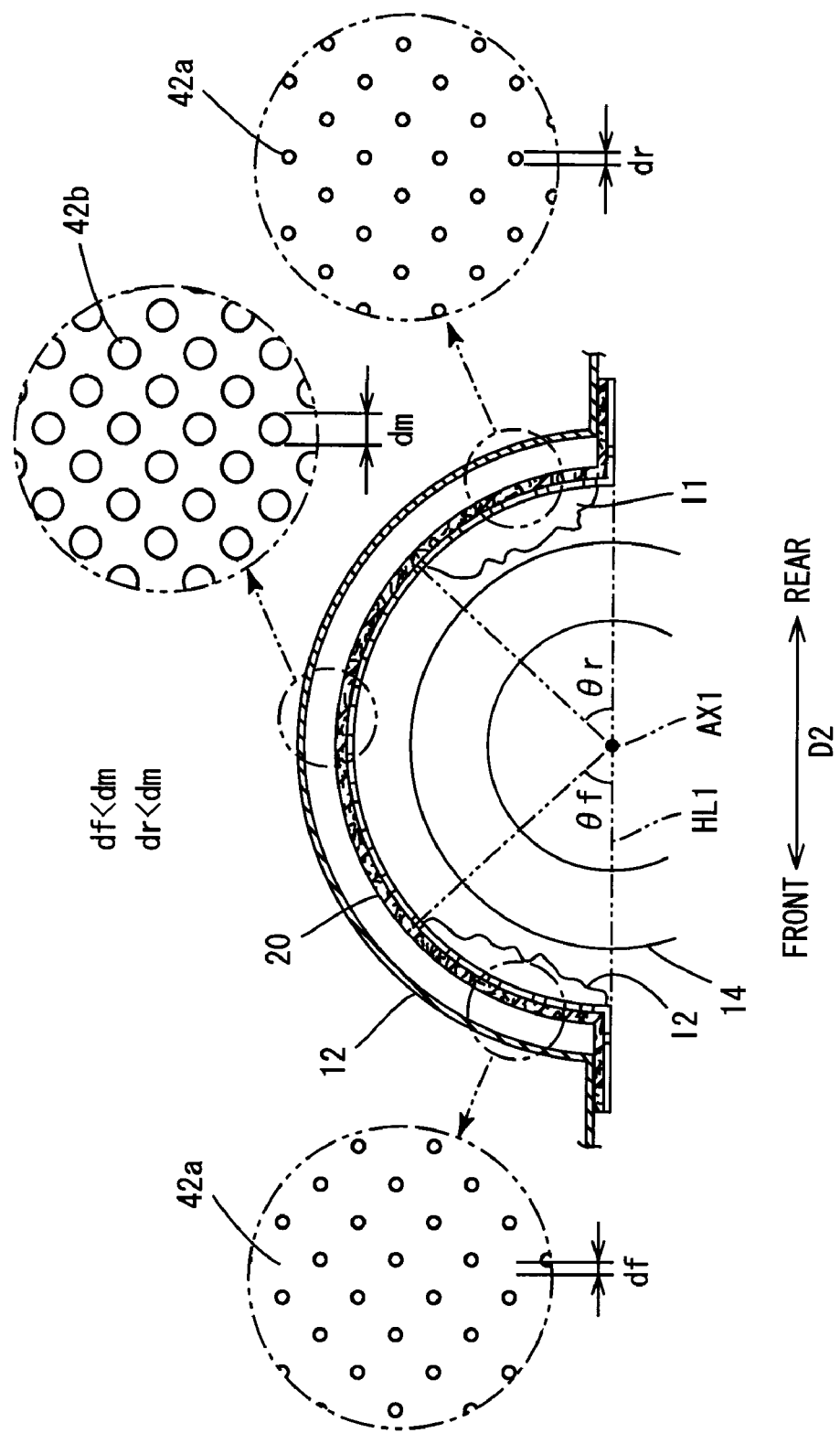
FIG. 9 is an exemplary illustration of a vertical end view showing a fender liner and surrounding area thereof according to a variation.

As shown in FIG. 9, the opening ratio p of the protective layer 40 may be an opening ratio depending on the location in the longitudinal direction D2 of the vehicle. It has been found that, when the vehicle runs in a cold region, muddy water, snow, or ice are thrown up, and a large amount of ice I1 adheres to the rear section of the fender liner 20, and also a large amount of ice I2 adheres to the front section of the fender liner 20. Accordingly, by setting opening ratios pf and pr relatively small in the front and rear sections, respectively, of the fender liner 20, and by setting an opening ratio pm relatively large in the middle section between the front and the rear sections, the antifouling and anti-icing performances can be further improved, and the sound absorbing performance can also be further improved. Note that the front section of the fender liner 20 is assumed to be the area located on the upper front side of a horizontal line HL1 that passes a rotation axis AX1 of the tire 14 and extends in the longitudinal direction D2, and ranging within a predetermined angle $\theta f$ ($0°<\theta f<90°$) of a sector around the rotation axis AX1. In addition, the rear section of the fender liner 20 is assumed to be the area located on the upper rear side of the horizontal line HL1 that passes the rotation axis AX1 of the tire 14 and extends in the longitudinal direction D2, and ranging within a predetermined angle $\theta r$ ($0°<\theta r<90°$) of a sector around the rotation axis AX1.

For example, in the case in which the number of the through-holes provided per unit area of the protective layer is set to be identical for each area, it is only necessary to satisfy df<dm and dr<dm, where df denotes the diameter of the through-holes provided in the front section of the fender liner; dr is the diameter of the through-holes provided in the rear section of the fender liner; and dm is the diameter of the through-holes provided in the middle section of the fender liner. Further, dr<df may be satisfied. Obviously, in the case in which the diameter of the through-holes provided in the protective layer is set to be identical for each area, the number of the through-holes provided per unit area of the protective layer may be relatively small in the front and rear sections, and relatively large in the middle section. Moreover, the number of the through-holes provided per unit area of the rear section of the fender liner may be smaller than the number of the through-holes provided per unit area of the front section of the fender liner.

(5) EXAMPLES

The present invention will be specifically described below by showing examples. However, the present invention is not limited to the examples.

Example 1

For the matrix fibers, PET fibers with a fineness of 17 decitex, a fiber length of 76 mm, and a melting point of 260° C. were used. For the binder fibers, PET fibers with a fiber diameter of 4.4 μm, a fiber length of 51 mm, and a melting point of 160° C. were used. For the material for forming the protective layer, PE with a melting point of 130° C. was used.

The matrix fibers and the binder fibers were mixed so as to have weights per unit area of 375 g/m² and 375 g/m², respectively, and needled to intertwine with each other, thereby producing a sheet-like material with a thickness of 3.4 mm. On the other hand, the PE heated to 150° C. was extruded into a film shape so as to have a weight per unit area of 150 g/m², and superimposed on the sheet-like material. Then, by using a large number of heated hot needles, a large number of through-holes with a diameter of 1.3 mm were formed in the protective layer so as to obtain an opening ratio of 10%. The overall thickness of the fender liner sample thus produced was 3.5 mm, and the overall flow resistance value thereof was 600 Nsm$^{-3}$.

Example 2

The same sheet-like material as that of example 1 was produced. On the other hand, PE heated to 150° C. was extruded into a film shape so as to have a weight per unit area of 250 g/m$^2$, and superimposed on the sheet-like material. Then, by using a large number of heated hot needles, a large number of through-holes were provided in the protective layer so as to obtain the opening ratios and the diameters shown below, and so as to obtain a uniform number of the through-holes per unit area.

|  | Test section 1 | Test section 2 | Test section 3 | Test section 4 |
|---|---|---|---|---|
| Opening ratio | 15% | 10% | 7% | 4% |
| Diameter of through-holes | 1.6 mm | 1.3 mm | 1.1 mm | 0.6 mm |

The overall thickness of the fender liner sample thus produced was 3.5 mm, and the overall flow resistance values thereof were as follows: 600 Nsm$^{-3}$ for test section 1, 730 Nsm$^{-3}$ for test section 2, 830 Nsm$^{-3}$ for test section 3, and 2000 Nsm$^{-3}$ for test section 4.

Comparative Example 1

For the matrix fibers, PET fibers with a fineness of 17 decitex, a fiber length of 76 mm, and a melting point of 260° C. were used. For the binder, latex of styrene-butadiene rubber (SBR) was used.

The matrix fibers and the binder were mixed so as to have weights per unit area of 630 g/m$^2$ and 270 g/m$^2$, respectively, and needled to intertwine with each other, thereby producing a fender liner sample with a thickness of 3.5 mm. The overall thickness of the fender liner sample thus produced was 3.5 mm, and the overall flow resistance value thereof was 500 Nsm$^{-3}$.

Comparative Example 2

A resin material made by adding 10% by weight of ethylene-propylene rubber (EPR) and 20% by weight of talc to 70% by weight of PP was formed into a sheet shape with a thickness of 2.0 mm, thereby producing a fender liner sample. This fender liner sample had a weight per unit area of 1000 g/m$^2$, and had no breathability.

Comparative Example 3

The same sheet-like material as that of example 1 was produced. On the other hand, PE heated to 150° C. was extruded into a film shape so as to have a weight per unit area of 250 g/m$^2$, and superimposed on the sheet-like material. However, the protective layer was provided with no through-holes.

The overall thickness of the fender liner sample thus produced was 3.5 mm, and had no breathability.

[Test Method for Sound Absorption Test]

For the samples of examples 1 and 2 and of comparative examples 1 and 3, sound absorption coefficients by reverberation method conforming to the ISO 354 were measured in the frequency range of 200 to 6300 Hz, by using a measuring device made by Brüel & Kjær.

[Test Method for Sound Insulation Test]

In order to evaluate sound insulation performance against impact noise generated when gravels or the like thrown up by a tire hit the fender liner, the APAMAT II equipment (made by Rieter) was used.

Figure 10:
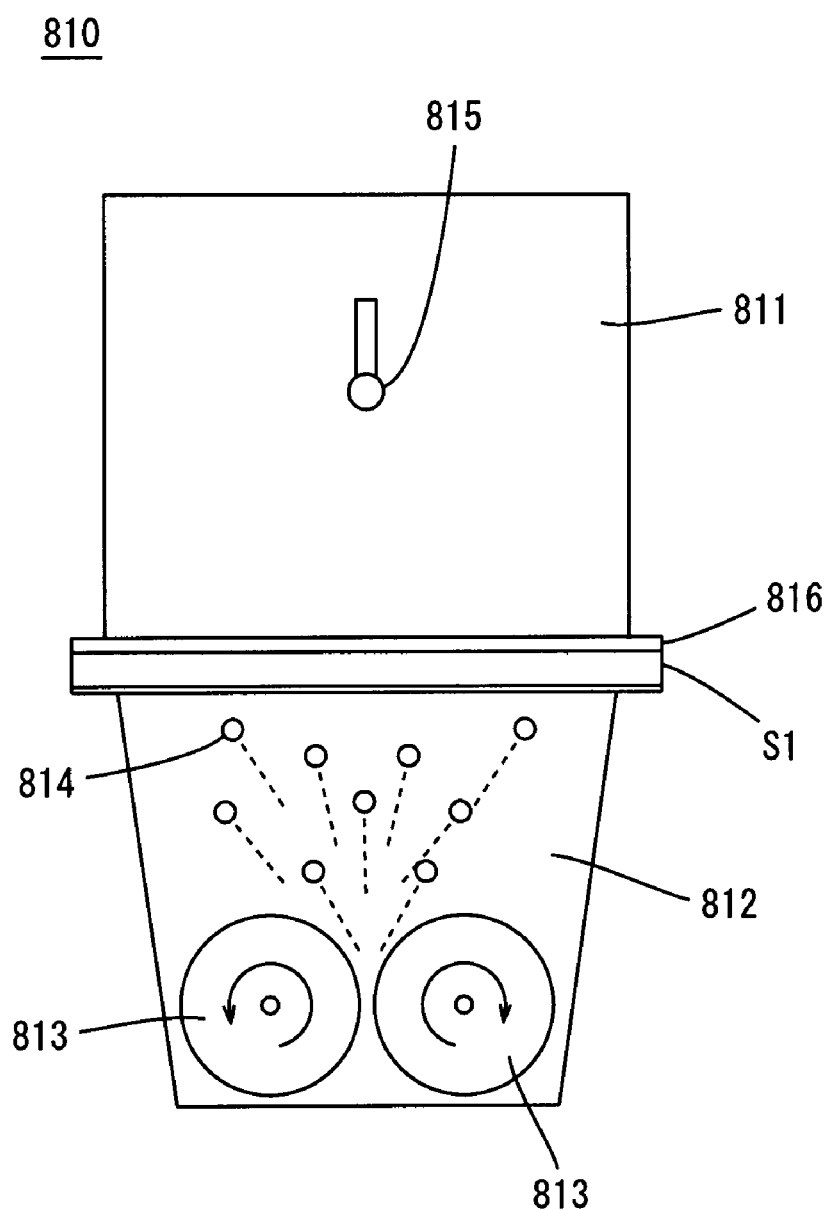
FIG. 10 is a view schematically showing a sound insulation performance measuring device used in examples.

FIG. 10 schematically shows a sound insulation performance measuring device 810. This measuring device 810 was provided with an anechoic chamber 811 in the upper section and a noise generating chamber 812 in the lower section, and equipped with an iron plate 816 for mounting a fender liner sample S1 between these chambers 811 and 812. An iron plate with a size of 840×840 mm±0.5 mm, a thickness of 0.75 mm±0.05 mm, and a weight of 4300 g was used as the iron plate 816. The fender liner sample S1 with a size of 840×840 mm was mounted on the lower side of the iron plate 816. The sample of example 1 was mounted to the iron plate 816 so that the protective layer faced downward. In the noise generating chamber 812, a pair of rollers 813 and 813 were installed, and a total of 200 iron balls 814 (8 mm in diameter) were contained. These iron balls 814 were thrown up by the rollers 813 and 813 and hit the sample S1. On the other hand, in the anechoic chamber 811, a Type 4190 ½-inch microphone 815 made by Brüel & Kjær was installed. Then, by measuring the sound pressure level reduction amount (dB) in the case where the sample S1 was mounted to the iron plate 816 as compared with the case where the sample S1 was not mounted to the iron plate 816, the sound insulation performance was evaluated with respect to noise such as the impact noise generated when the iron balls 814 hit the sample S1.

The measurement mentioned above was made for the samples of example 1, and of comparative examples 1 and 2.

[Measuring Method for Ice Adhesion Strength]

Figure 11:
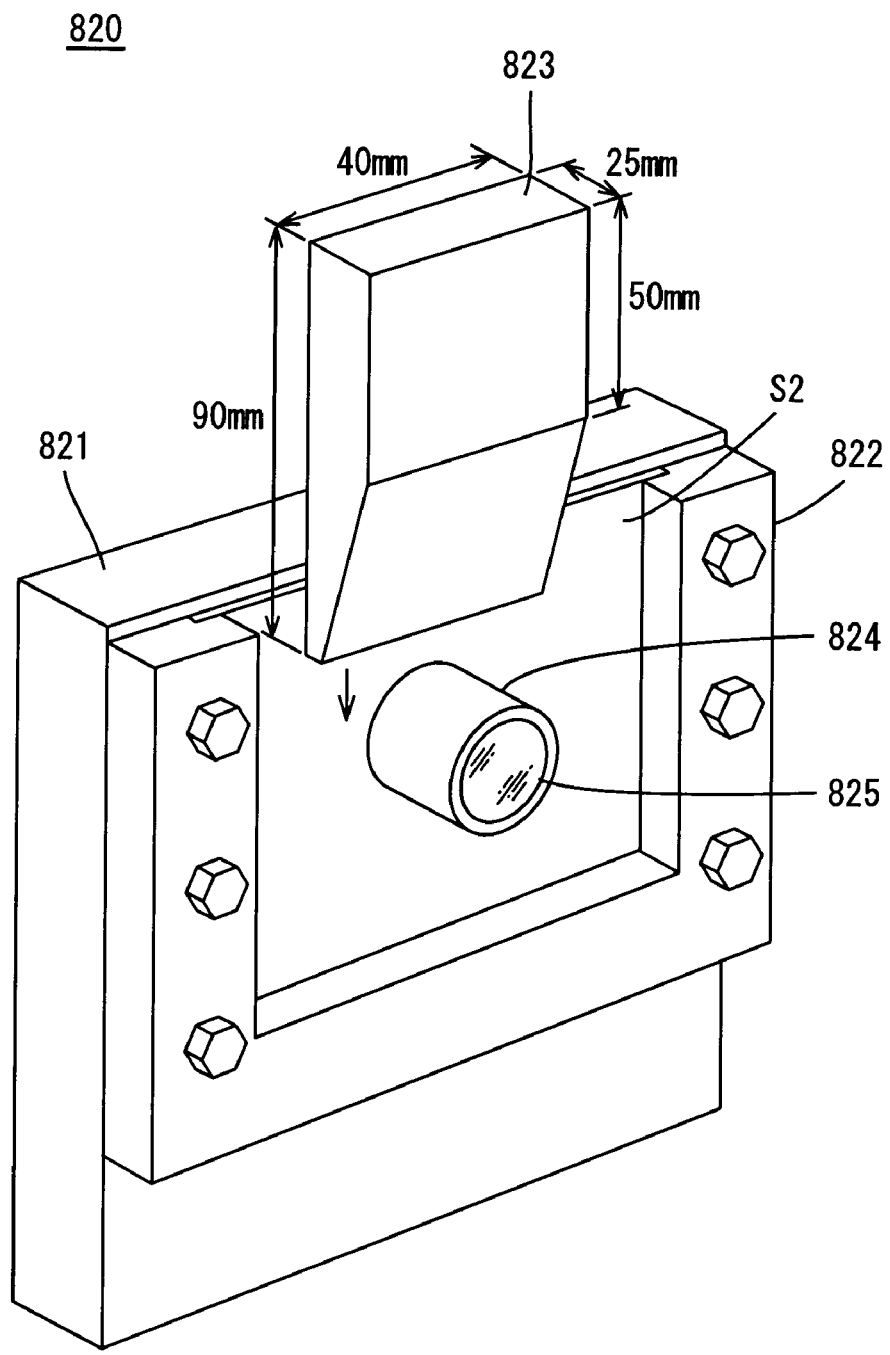
FIG. 11 is a view schematically showing an ice adhesion strength measuring device used in the examples.

FIG. 11 schematically shows an ice adhesion strength measuring device 820. This measuring device 820 is a device in which a fender liner sample S2 is sandwiched between a flat-plate-shaped fixing base plate 821 made of iron and a substantially U-shaped holding member 822 made of iron, and ice 825 adhering to the sample S2 in a stainless-steel ring member 824 is sheared by a pressing member 823 to measure the shearing force. For the ring member 824, a member of SUS304 with an inner diameter of 15 mm, an outer diameter of 35 mm, and a height of 15 mm was used. The ring member 824 was placed on top of the sample S2 soaked with water in advance; then, water was poured into the ring member 824 and frozen. Then, the sample S2 was sandwiched between the fixing base plate 821 and the holding member 822, and fastened with bolts.

The pressing member 823 was moved down toward the ring member 824 at a speed of 10 mm/min, and the maximum force applied to the ring member 824, that is, the shearing force to the ice 825 adhering to the sample was measured.

The measurement described above was made for the samples of example 1, of test sections 1 to 3 of example 2, and of comparative example 1.

[Test Method for Anti-Icing Performance]

A sport utility vehicle equipped with the fender liner sample of example 1 or of comparative example 1 is driven on the snow-covered road in the cold region (snow depth: 50 to 150 mm, weather: sunny, outside air temperature: −15° C. to −10° C.) at an average speed of 50 km/h for 60 minutes (travel distance: approximately 30 km). Then, the fender liner sample was taken out of the vehicle and the mass thereof was measured. Note that, in order to facilitate the evaluation of anti-icing performance, the tests were conducted after adhering water on whole area of the fender liner samples before mounting.

[Test Results]

Figure 12:
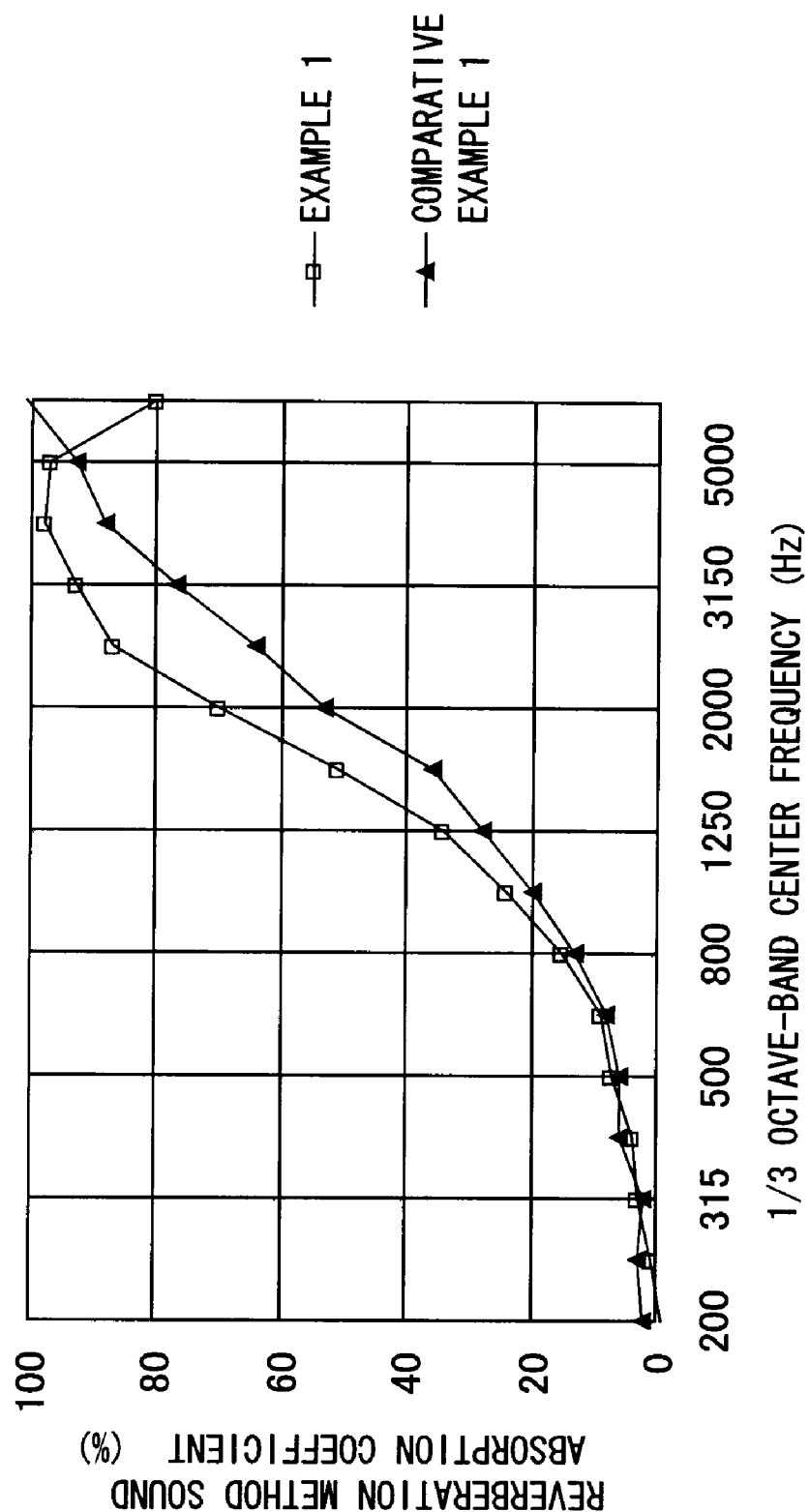
FIG. 12 shows an exemplary illustration of a graph illustrating reverberation method sound absorption coefficient with respect to frequency.

FIG. 12 shows a graph illustrating the reverberation method sound absorption coefficient (unit: %) with respect to the frequency band (unit: Hz) at intervals of ⅓ octave, for example 1 and comparative example 1. As shown in FIG. 12, the sound absorption coefficient of example 1 was larger than that of comparative example 1 in the frequency range of 500 to 5000 Hz. This frequency range includes the medium-frequency range that is relatively audible to the human ear, and particularly includes the frequency of 2000 Hz to which the human ear is the most sensitive.

Figure 13:
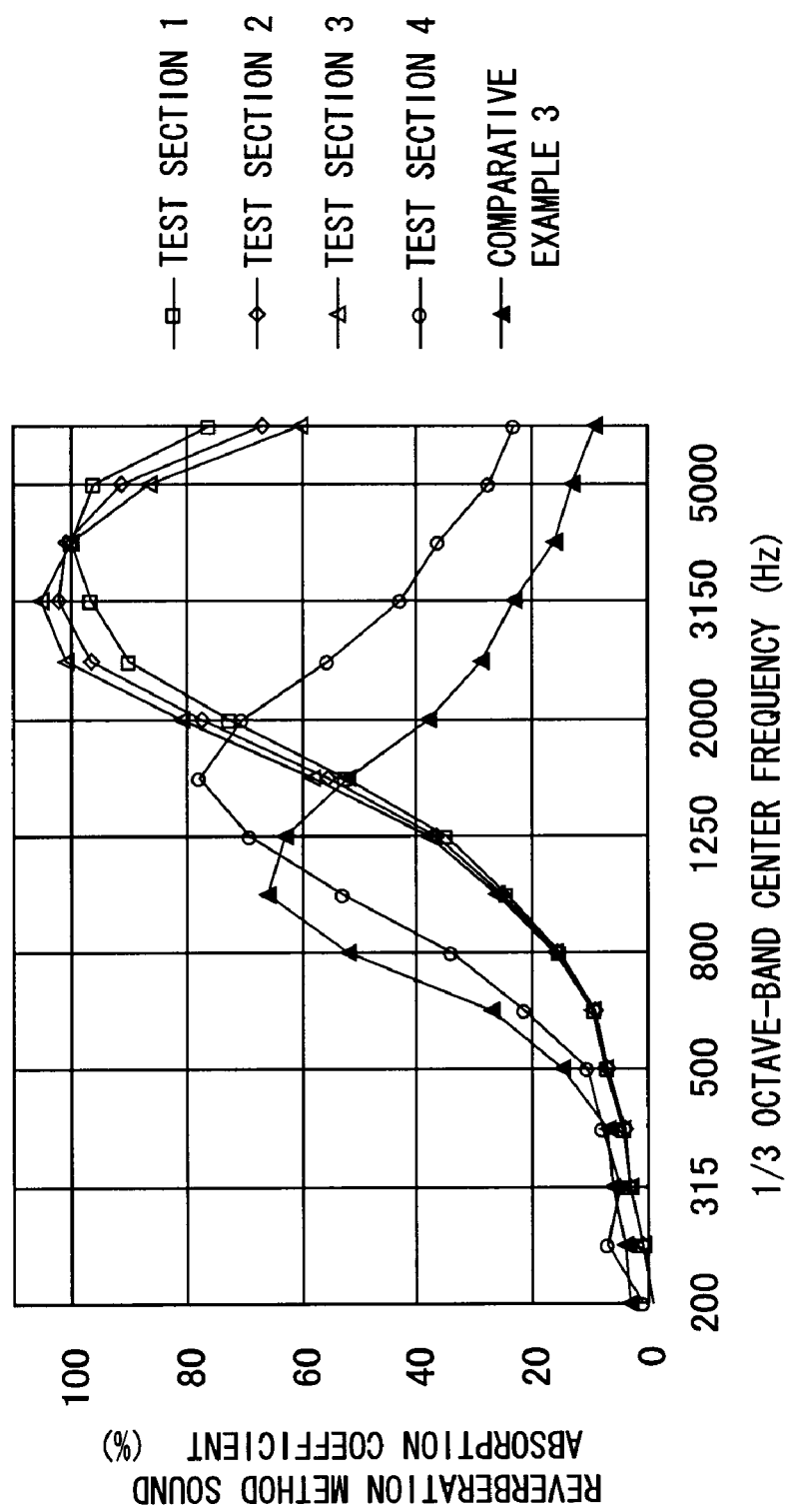
FIG. 13 shows an exemplary illustration of another graph illustrating reverberation method sound absorption coefficient with respect to frequency.

FIG. 13 shows a graph illustrating the reverberation method sound absorption coefficient (unit: %) with respect to the frequency band (unit: Hz) at intervals of ⅓ octave, for test sections 1 to 4 of example 2 and for comparative example 3. As shown in FIG. 13, the peak frequency for the sound absorption coefficient of comparative example 3 was 1000 Hz. On the other hand, the peak frequencies for the sound absorption coefficients of example 2 were in the range of 1600 Hz to 4000 Hz. This frequency range includes the medium-frequency range that is relatively audible to the human ear, and particularly includes the frequency of 2000 Hz to which the human ear is the most sensitive. It shows that the fender liner having the protective layer provided with the through-holes has an improved sound absorbing performance compared with the fender liner having the protective layer provided with no through-holes.

Consequently, it has been verified that the fender liner of the present invention ensures favorable sound absorbing performance.

Note that the peak frequency decreases as the opening ratio decreases, and the peak frequency also decreases as the diameter of the through-holes decreases. Therefore, it is possible to obtain a desired sound absorbing performance by adjusting the opening ratio of the protective layer or the diameter of the through-holes.

Figure 14:
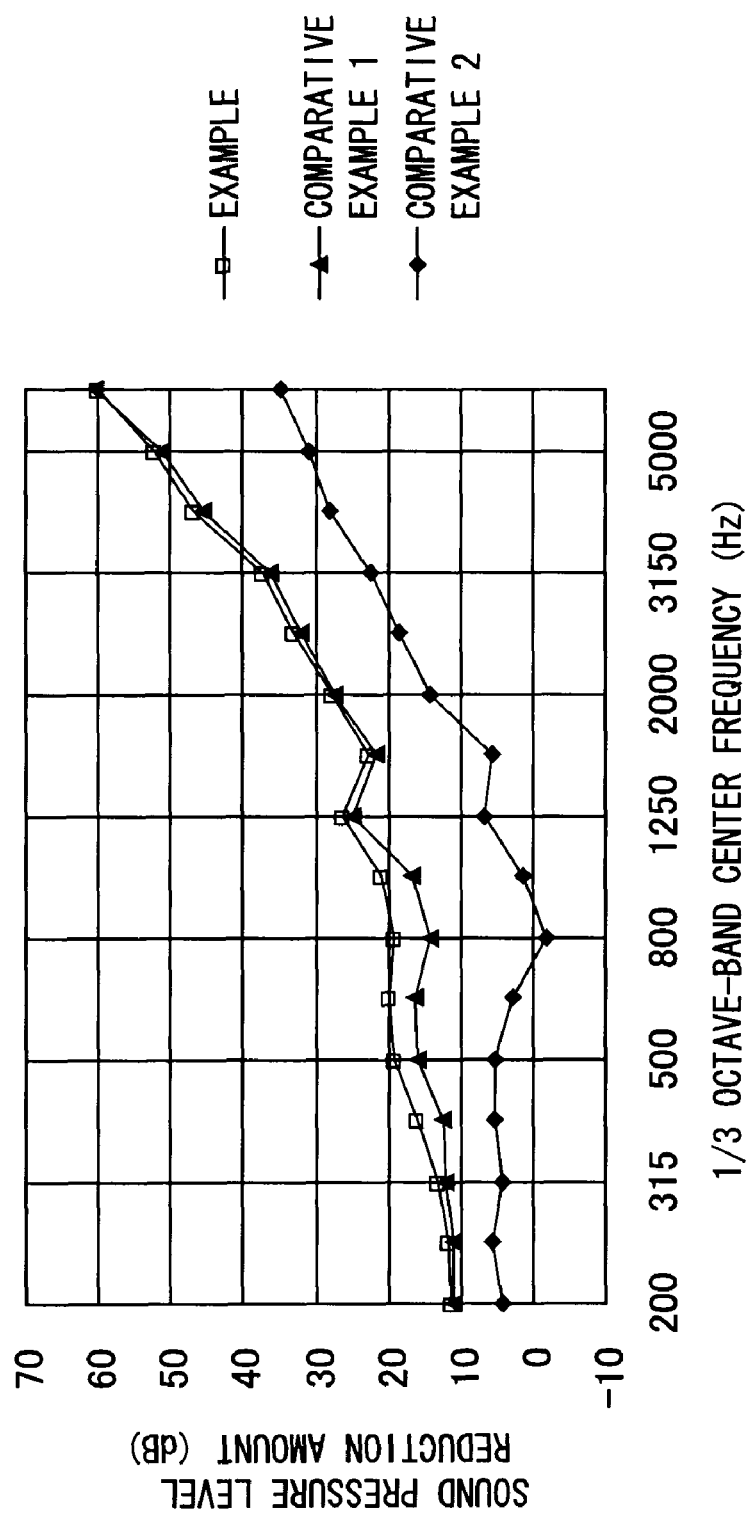
FIG. 14 shows an exemplary illustration of a graph illustrating sound pressure level reduction amount with respect to frequency.

FIG. 14 shows a graph illustrating the sound pressure level reduction amount (unit: dB) with respect to the frequency band (unit: Hz) at intervals of ⅓ octave, for example 1, and for comparative examples 1 and 2. As shown in FIG. 14, the sound pressure level reduction amount of example 1 was generally larger than the sound pressure level reduction amounts of comparative examples 1 and 2. Consequently, it has been verified that the fender liner of the present invention ensures favorable sound insulation performance.

Table 1 shows the results of measurement of the shearing force corresponding to the ice adhesion strength, for example 1 and comparative example 1.

TABLE 1

|  | Example 1 | Comparative example 1 |
|---|---|---|
| Shearing force (N) | 270 | 650 |

As shown in the table, the ice adhesion strength of example 1 was smaller than that of comparative example 1. Consequently, it has been verified that the fender liner of the present invention ensures favorable anti-icing performance because adhered ice is easily unstuck.

Table 2 shows the results of measurement of the shearing force corresponding to the ice adhesion strength, for test sections 1 to 3 of example 2.

TABLE 2

|  | Test section 1 | Test section 2 | Test section 3 |
|---|---|---|---|
| Opening ratio | 15% | 10% | 7% |
| Diameter of through-holes | 1.6 mm | 1.3 mm | 1.1 mm |
| Shearing force (N) | 306 | 270 | 148 |

As shown in the table, it was found that the ice adhesion strength decreases as the opening ratio decreases, and ice adhesion strength also decreases as the diameter of the through-holes decreases. In addition, all of the ice adhesion strengths of example 2 were smaller than the ice adhesion strength of comparative example 1. Consequently, it has been verified that the fender liner of the present invention ensures favorable anti-icing performance because adhered ice is easily unstuck.

Table 3 shows the results of measurement of the mass of adhering ice corresponding to ice adhesiveness, for example 1 and comparative example 1.

TABLE 3

|  | Example 1 | Comparative example 1 |
|---|---|---|
| Initial mass (g) | 370 | 390 |
| Mass after ice adhesion (g) | 960 | 1540 |
| Mass of adhering ice (g) | 590 | 1150 |

As shown in the table, the mass of adhering ice of example 1 was smaller than that of comparative example 1. Consequently, it has been verified that the fender liner of the present invention ensures favorable anti-icing performance.

As shown above, according to the fender liner of the present invention, it has been verified that both favorable anti-icing performance and favorable sound absorbing performance can be obtained.

Note that the present invention is not limited to the embodiment and the variations that have been described above, but the present invention also includes a structure obtained by mutually replacing or changing combination of structures disclosed in the above-described embodiment and variations, a structure obtained by mutually replacing or changing combination of structures disclosed in known technologies and in the above-described embodiment and variations, and the like.

With the invention, a fender liner with favorable antifouling and anti-icing performances, and with favorable sound absorbing performance can be provided.

With the invention, the fender liner with more favorable antifouling and anti-icing performances, and with more favorable sound absorbing performance can be provided.

With the invention, the sound absorbing performance can be improved.

With the invention, it is possible to effectively produce a fender liner with favorable antifouling and anti-icing performances, and with favorable sound absorbing performance.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A fender liner attached to a motor vehicle wheel house, comprising:
a breathable base material layer produced by forming a fiber assembly into a shape along the wheel house; and
a protective layer made of waterproof material;
the protective layer is laminated on a surface of the base material layer that is opposite to a side facing the wheel house;
the protective layer is provided with a plurality of through-holes that allow air to flow through the protective layer to the surface of the base material layer on which the protective layer is laminated;
the fender liner has a middle section between front and rear sections of the fender liner; and
an opening ratio in the middle section is larger than opening ratios in the front and the rear sections.

2. A fender liner attached to a motor vehicle wheel house, comprising:
a breathable base material layer produced by forming a fiber assembly into a shape along the wheel house; and
a protective layer made of a waterproof film-like material obtained by thermoforming thermoplastic resin material;
the base material layer is formed by thermoforming a sheet-like material obtained by intertwining a mixture of matrix fibers and binder fibers through needling;
the protective layer is laminated on a first surface of the base material layer that is opposite to a side facing the wheel house;
the protective layer is produced by forming a plurality of through-holes by passing a plurality of hot needles through the film-like material independently from intertwining the mixture of fibers of the base material layer;
the plurality of through-holes allows air to flow through the protective layer to the surface of the base material layer on which the protective layer is laminated;
the base material layer has a second surface in contact with air opposite to a side on which the protective layer is laminated;
the base material layer has a flow resistance value of 20 to 500 $Nsm^{-3}$;
the protective layer has a flow resistance value of 200 to 3800 $Nsm^{-3}$; and
the fender liner has a flow resistance value of 250 to 4000 $Nsm^{-3}$;
the fender liner has a middle section between front and rear sections of the fender liner; and
an opening ratio in the middle section is larger than opening ratios in the front and the rear sections.

3. The fender liner according to claim 2, wherein the through-holes of the protective layer have a diameter of 0.3 to 5.0 mm, and the protective layer has an opening ratio of 0.5% to 15.0% in area ratio.

4. The fender liner according to claim 2, wherein the surface of the base material layer on which the protective layer is laminated is provided with holes connected to the through-holes and recessed toward the wheel house.

5. The fender liner according to claim 2, obtained by:
laminating a waterproof thermoplastic film-like material serving as the protective layer on one surface of the sheet-like material of the fiber assembly serving as the base material layer;
forming the plurality of through-holes by passing the plurality of hot needles through the film-like material from a side of the film-like material using a perforator equipped with the plurality of hot needles; and
forming the film-like material provided with the plurality of through-holes and the sheet-like material into a shape along the wheel house while heating the materials in a laminated state.

6. A process for producing a fender liner attached to a motor vehicle wheel house, comprising:
laminating a waterproof thermoplastic film-like material on one surface of a breathable sheet-like material of a fiber assembly;
forming a plurality of through-holes by passing a plurality of hot needles through the film-like material from a side of the film-like material using a perforator equipped with the plurality of hot needles; and
forming the film-like material provided with the plurality of through-holes and the sheet-like material into a shape along the wheel house while heating the materials in a laminated state;
wherein
the fender liner has a middle section between front and rear sections of the fender liner; and
an opening ratio in the middle section is larger than opening ratios in the front and the rear sections.

7. The fender liner according to claim 5, wherein a diameter of the through-holes provided in the film-like material is larger than a diameter of the through-holes provided in the protective layer.

8. The fender liner according to claim 5, wherein an opening ratio of the film-like material is larger than an opening ratio of the protective layer.

9. The process according to claim 6, wherein a diameter of the through-holes provided in the film-like material is larger than a diameter of through-holes provided in the protective layer.

10. The process according to claim 6, wherein an opening ratio of the film-like material is larger than an opening ratio of the protective layer.

* * * * *